United States Patent
Deur-Bert et al.

(10) Patent No.: US 9,683,155 B2
(45) Date of Patent: Jun. 20, 2017

(54) COMPOSITION CONTAINING 2,3,3,3-TETRAFLUOROPROPENE AND 1,2-DIFLUOROETHYLENE

(71) Applicant: ARKEMA FRANCE, Colombes (FR)

(72) Inventors: Dominique Deur-Bert, Charly (FR); Laurent Wendlinger, Soucieu en Jarrest (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 14/651,925

(22) PCT Filed: Dec. 6, 2013

(86) PCT No.: PCT/FR2013/052972
§ 371 (c)(1),
(2) Date: Jun. 12, 2015

(87) PCT Pub. No.: WO2014/102477
PCT Pub. Date: Jul. 3, 2014

(65) Prior Publication Data
US 2015/0322321 A1 Nov. 12, 2015

(30) Foreign Application Priority Data
Dec. 26, 2012 (FR) ..................... 12 62765

(51) Int. Cl.
| | | |
|---|---|---|
| *C09K 5/04* | (2006.01) | |
| *H01B 3/56* | (2006.01) | |
| *C09K 3/00* | (2006.01) | |
| *B01F 17/00* | (2006.01) | |
| *C09K 3/30* | (2006.01) | |

(52) U.S. Cl.
CPC .......... *C09K 5/045* (2013.01); *B01F 17/0085* (2013.01); *C09K 3/00* (2013.01); *C09K 3/30* (2013.01); *H01B 3/56* (2013.01); *C09K 2205/126* (2013.01); *C09K 2205/13* (2013.01); *C09K 2205/22* (2013.01); *C09K 2205/32* (2013.01)

(58) Field of Classification Search
CPC .............. C09K 5/045; C09K 2205/126; C09K 2205/32; C09K 2205/22
See application file for complete search history.

(56) References Cited

U.S. PATENT DOCUMENTS

| | | |
|---|---|---|
| 8,070,977 B2 | 12/2011 | Rached |
| 8,075,798 B2 | 12/2011 | Rached |
| 8,246,850 B2 | 8/2012 | Rached |
| 8,252,198 B2 | 8/2012 | Rached |
| 8,557,135 B2 | 10/2013 | Rached |
| 8,808,569 B2 | 8/2014 | Rached |
| 8,858,824 B2 | 10/2014 | Boussand |
| 8,858,825 B2 | 10/2014 | Guerin et al. |
| 9,011,711 B2 | 4/2015 | Rached |
| 9,028,706 B2 | 5/2015 | Rached et al. |
| 9,039,922 B2 | 5/2015 | Rached |
| 9,127,191 B2 | 9/2015 | Rached |
| 9,133,379 B2 | 9/2015 | Rached |
| 9,175,203 B2 | 11/2015 | Rached |
| 9,267,064 B2 | 2/2016 | Rached |
| 9,315,708 B2 | 4/2016 | Guerin et al. |
| 9,399,726 B2 | 7/2016 | Rached |
| 9,505,968 B2 | 11/2016 | Rached |
| 9,512,343 B2 | 12/2016 | Rached et al. |
| 9,599,381 B2 | 3/2017 | Rached |
| 2011/0084228 A1 | 4/2011 | Rached |
| 2011/0095224 A1 | 4/2011 | Rached |
| 2011/0186772 A1 | 8/2011 | Rached |
| 2011/0219791 A1 | 9/2011 | Rached |
| 2011/0219792 A1 | 9/2011 | Rached |
| 2011/0240254 A1 | 10/2011 | Rached |
| 2011/0252801 A1 | 10/2011 | Minor et al. |
| 2011/0253927 A1* | 10/2011 | Minor ..................... C08J 9/146 252/68 |
| 2011/0284181 A1 | 11/2011 | Rached |
| 2012/0049104 A1 | 3/2012 | Rached |
| 2012/0056123 A1 | 3/2012 | Rached |
| 2012/0068105 A1 | 3/2012 | Rached et al. |

(Continued)

FOREIGN PATENT DOCUMENTS

WO    WO 2012/011609 A1    1/2012

OTHER PUBLICATIONS

Guérin, Sophie, et al., U.S. Appl. No. 14/903,461, entitled, "2,3,3,3-Tetrafluoropropene Compositions Having improved Miscibility," filed in the U.S. Patent and Trademark Office on Jan. 7, 2016.
Boussand, Beatrice, et al., U.S. Appl. No. 14/990,159, entitled "Stable 2,3,3,3-Tetrafluoropropene Composition," filed in the U.S. Patent and Trademark Office on Jan. 7, 2016.
Rached, Wissam, U.S. Appl. No. 14/992,387 entitled, "Ternary Compositions for High-Capacity Refrigeration," filed in the U.S. Patent and Trademark Office on Jan. 11, 2016.
Guerin, Sophie, et al., U.S. Appl. No. 15/070,955, entitled "Heat-Transfer Compositions Exhibiting Improved Miscibility with the Lubricating Oil," filed in the U.S. Patent and Trademark Office on Mar. 15, 2016.

(Continued)

*Primary Examiner* — John Hardee
(74) *Attorney, Agent, or Firm* — Buchanan Ingersoll & Rooney P.C.

(57) ABSTRACT

Compositions containing 2,3,3,3-tetrafluoropropene and 1,2-difluoroethylene, that can be used in multiple fields of application. The composition can include from 45 to 90 mol % of 2,3,3,3-tetrafluoropropene and from 55 to 10 mol % of, 1,2-difluoroethylene. The composition can include from 55 to 80 mol % of 2,3,3,3-tetrafluoropropene and from 45 to 20 mol % of 1,2-difluoroethylene. The composition can include from 62 to 69 mol % of 2,3,3,3-tetrafluoropropene and from 38 to 31 mol % of 1,2-difluoroethylene at a temperature of between −30° C. and 56° C. and a pressure of between 1 and 15 bar.

8 Claims, No Drawings

(56) References Cited

U.S. PATENT DOCUMENTS

| | | |
|---|---|---|
| 2012/0144857 A1 | 6/2012 | Rached |
| 2012/0151958 A1 | 6/2012 | Rached |
| 2012/0151959 A1 | 6/2012 | Rached |
| 2012/0153213 A1 | 6/2012 | Rached |
| 2012/0159982 A1 | 6/2012 | Rached |
| 2012/0161064 A1 | 6/2012 | Rached |
| 2012/0167615 A1 | 7/2012 | Rached |
| 2012/0205574 A1 | 8/2012 | Rached et al. |
| 2013/0092869 A1 | 4/2013 | Boussand |
| 2013/0105296 A1 | 5/2013 | Chaki et al. |
| 2013/0105724 A1 | 5/2013 | Boussand |
| 2013/0186114 A1 | 7/2013 | Guerin et al. |
| 2014/0008565 A1 | 1/2014 | Rached et al. |
| 2014/0075969 A1 | 3/2014 | Guerin et al. |
| 2014/0318160 A1 | 10/2014 | Rached |
| 2014/0326017 A1 | 11/2014 | Rached |
| 2015/0027146 A1 | 1/2015 | Boussand |
| 2015/0152306 A1 | 6/2015 | Rached |
| 2015/0152307 A1 | 6/2015 | Rached |
| 2015/0322317 A1 | 11/2015 | Collier et al. |
| 2015/0344761 A1 | 12/2015 | Rached |
| 2015/0353799 A1 | 12/2015 | Deur-Bert et al. |
| 2015/0353802 A1 | 12/2015 | Rached |
| 2016/0009555 A1 | 1/2016 | Bonnet et al. |
| 2016/0024363 A1 | 1/2016 | Rached |
| 2016/0025394 A1 | 1/2016 | Rached |
| 2016/0115361 A1 | 4/2016 | Boussand |
| 2016/0122609 A1 | 5/2016 | Rached |
| 2016/0194541 A1 | 7/2016 | Guerin et al. |
| 2016/0244652 A1 | 8/2016 | Rached |
| 2016/0272561 A1 | 9/2016 | Rached et al. |
| 2016/0298014 A1 | 10/2016 | Rached |
| 2016/0355718 A1 | 12/2016 | Rached |
| 2016/0376484 A1 | 12/2016 | Guerin et al. |
| 2017/0037291 A1 | 2/2017 | Rached et al. |
| 2017/0080773 A1 | 3/2017 | Rached |

OTHER PUBLICATIONS

Rached, Wissam, et al., U.S. Appl. No. 15/073,108, entitled "Stabilization of 1-Chloro-3,3,3-Trifluoropropene," filed in the U.S. Patent and Trademark Office on Mar. 17, 2016.
U.S. Appl. No. 14/651,855, Collier, et al.
U.S. Appl. No. 14/655,500, Deur-Bert, et al.
U.S. Appl. No. 14/823,430, Rached.
U.S. Appl. No. 14/830,130, Rached.
U.S. Appl. No. 14/772,950, Bonnet, et al.
U.S. Appl. No. 14/873,855, Rached.
U.S. Appl. No. 14/873,891, Rached.
Collier, Bertrand, et al., U.S. Appl. No. 14/651,855 entitled "Composition Including 2,3,3,3-Tetrafluoropropene," filed in the U.S. Patent and Trademark Office on Jun. 12, 2015.
Deur-Bert, Dominique, et al., U.S. Appl. No. 14/655,500 entitled "Azeotropic or Quasi-Azeotropic Composition of Chloromethane," filed in the U.S. Patent and Trademark Office on Jun. 25, 2015.
Rached, Wissam, U.S. Appl. No. 14/823,430 entitled "Use of Ternary Compositions," filed in the U.S. Patent and Trademark Office on Aug. 11, 2015.
Rached, Wissam, U.S. Appl. No. 14/830,130 entitled "Binary Refrigerating Fluid," filed in the U.S. Patent and Trademark Office on Aug. 19, 2015.
Bonnet, Phillippe, et al., U.S. Appl. No. 14/772,950 entitled "Composition Comprising HF and 2,3,3,3-Tetrafluoropropene," filed in the U.S. Patent and Trademark Office on Sep. 4, 2015.
Rached, Wissam, U.S. Appl. No. 14/873,855 entitled "Heat Transfer Fluid," filed in the U.S. Patent and Trademark Office on Oct. 2, 2015.
Rached, Wissam, U.S. Appl. No. 14/873,891 entitled "Ternary Compositions for Low-Capacity Refrigeration," filed in the U.S. Patent and Trademark Office on Oct. 2, 2015.
International Search Report (PCT/ISA/210) mailed on Mar. 11, 2014, by the Japanese Patent Office as the International Searching Authority for International Application No. PCT/FR2013/052972.
Rached, Wissam, U.S. Appl. No. 15/238,883 entitled "Heat Transfer Fluid Replacing R-134a," filed in the U.S. Patent and Trademark Office on Aug. 17, 2016.
Rached, Wissam, U.S. Appl. No. 15/297,569 entitled "Composition based on 2,3,3,3-Tetrafluoropropene," filed in the U.S. Patent and Trademark Office on Oct. 19, 2016.
Rached, Wissam, U.S. Appl. No. 15/396,855 entitled "Heat Transfer Fluid," filed in the U.S. Patent and Trademark Office on Jan. 3, 2017.
Collier, Bertrand, et al., U.S. Appl. No. 15/481,815 entitled "Composition Including 2,3,3,3-Tetrafluoropropene," filed in the U.S. Patent and Trademark Office on Apr. 7, 2017.
Deur-Bert, Dominque, et al., U.S. Appl. No. 15/481,873 entitled "Azeotropic or Quasi-Azeotropic Composition of Chloromethane," filed in the U.S. Patent and Trademark Office on Apr. 7, 2017.
Deur-Bert, Dominique, et al., U.S. Appl. No. 15/490,541 entitled "Composition Containing 2,3,3,3-Tetrafluoropropene and 1,2-Difluoroethylene," filed in the U.S. Patent and Trademark Office on Apr. 18, 2017.
Rached, Wissam, U.S. Appl. No. 15/491,717 entitled "Heat Transfer Method," filed in the U.S. Patent and Trademark Office on Apr. 19, 2017.

* cited by examiner

COMPOSITION CONTAINING 2,3,3,3-TETRAFLUOROPROPENE AND 1,2-DIFLUOROETHYLENE

The present invention relates to compositions comprising 2,3,3,3-tetrafluoropropene and 1,2-difluoroethylene that are useful in many fields of application.

Fluids based on halocarbons have thus found many applications in various industrial fields, in particular as heat transfer fluid, propellants, foaming agents, blowing agents, gaseous dielectrics, monomer or polymerization medium, support fluids, agents for abrasives, drying agents and fluids for energy production units.

Particular importance is given to fluids that have a low impact on the environment.

The advantage of using azeotropic or quasi-azeotropic fluids is that they do not fractionate during evaporation processes and act (almost) as a pure body. However, it is difficult to identify novel fluids that meet these characteristics, since azeotropes cannot be predicted.

The subject of the present invention is an azeotropic or quasi-azeotropic composition comprising the compounds 2,3,3,3-tetrafluoropropene and 1,2-difluoroethylene.

In what follows, the following compounds represent:
2,3,3,3-tetrafluoropropene: HFO-1234yf or 1234yf
1,2-difluoroethylene: HFO-1132 or 1132

The expression "quasi-azeotropic" has a broad meaning and is intended to include the compositions that are strictly azeotropic and those that behave as an azeotropic mixture.

A mixture is azeotropic when the pressure at the dew point is equal to that at the bubble point, which means that the vapor composition is equal to that of the condensed liquid.

A mixture is considered to be quasi-azeotropic when the pressure difference between the pressure at the dew point and the pressure at the bubble point is less than or equal to 5%, on the basis of the pressure at the bubble point.

According to one embodiment, the composition according to the invention comprises, preferably essentially consisting of, from 45 to 90 mol % of 2,3,3,3-tetrafluoropropene and from 55 to 10 mol % of 1,2-difluoroethylene.

According to one embodiment, the composition according to the invention comprises, preferably essentially consisting of, from 55 to 80 mol % of 2,3,3,3-tetrafluoropropene and from 45 to 20 mol % of 1,2-difluoroethylene.

According to another embodiment the composition according to the invention, comprises at least hydrogen fluoride.

According to one embodiment, the composition according to the invention comprises, preferably essentially consisting of, from 10 to 55 mol % of HF, 30 to 75 mol % of 2,3,3,3-tetrafluoropropene and 15 to 40 mol % of 1,2-difluoroethylene.

The invention also relates to the use of a fluid comprising the composition according to the invention as heat transfer fluid, propellants, foaming agents, blowing agents, gaseous dielectrics, monomer or polymerization medium, support fluids, agents for abrasives, drying agents and fluids for energy production units.

Preferably, the invention relates to the use of a fluid comprising the composition according to the invention as heat transfer fluid in a heat pump or refrigeration plant.

The invention also relates to a heat transfer plant comprising a vapor compression circuit containing a fluid comprising a composition according to the invention as heat transfer fluid or containing a heat transfer fluid as described above.

According to one embodiment, the plant is selected from mobile or stationary plants for heating via a heat pump, for air conditioning, and in particular for motor vehicle air conditioning or for centralized stationary air conditioning, for refrigeration or for freezing and Rankine cycles; and which is preferably an air conditioning plant.

The invention also relates to a process for heating or cooling a fluid or a body by means of a vapor compression circuit containing a heat transfer fluid, said process successively comprising the evaporation of the heat transfer fluid, the compression of the heat transfer fluid, the condensation of the heat fluid and the expansion of the heat transfer fluid, in which the heat transfer fluid is a fluid comprising a composition according to the invention.

The expression "heat transfer fluid" is understood to mean a fluid capable of absorbing heat by evaporating at low temperature and low pressure and of releasing heat by condensing at high temperature and high pressure, in a vapor compression circuit.

A heat transfer fluid optionally comprises one or more additives which are not heat transfer compounds for the envisaged application. The additives may in particular be selected from lubricants, nanoparticles, stabilizers, surfactants, tracers, fluorescent agents, odorous agents and solubilizing agents, as are well known to a person skilled in the art.

TABLE 1

| | Pressure: 1 bar absolute | | | Pressure 3 bar absolute | | |
|---|---|---|---|---|---|---|
| Azeotrope | Temperature (° C.) | Mole (%) of 1234yf | Mole (%) of 1132 | Temperature ° C. | Mole (%) of 1234yf | Mole (%) of 1132 |
| 1234yf/1132 | −30 | 62 | 38 | −2 | 65 | 35 |
| | Pressure 10 bar absolute | | | Pressure 15 bar absolute | | |
| Azeotrope | Temperature (° C.) | Mole (%) of 1234yf | Mole (%) of 1132 | Temperature ° C. | Mole (%) of 1234yf | Mole (%) of 1132 |
| 1234yf/1132 | 39 | 67 | 33 | 56 | 69 | 31 |

According to one particularly preferred embodiment, the composition according to the invention comprises, preferably essentially consisting of, from 62 to 69 mol % of 2,3,3,3-tetrafluoropropene and from 38 to 31 mol % of 1,2-difluoroethylene at a temperature of between −30° C. and 56° C. and a pressure of between 1 and 15 bar.

The invention claimed is:

1. An azeotropic composition comprising about 62 mol % of 2,3,3,3-tetrafluoropropene and about 38 mol % of 1,2-difluoroethylene, wherein the composition is azeotropic at a temperature of −30° C. and a pressure of 1 bar.

2. A heat transfer fluid comprising the azeotropic composition of claim 1 and at least one additive selected from the group consisting of lubricants, nanoparticles, stabilizers, surfactants, tracers, fluorescent agents, odorous agents and solubilizing agents.

3. An azeotropic composition comprising about 65 mol % of 2,3,3,3-tetrafluoropropene and about 35 mol % of 1,2-difluoroethylene, wherein the composition is azeotropic at a temperature of −2° C. and a pressure of 3 bar.

4. A heat transfer fluid comprising the azeotropic composition of claim 3 and at least one additive selected from the group consisting of lubricants, nanoparticles, stabilizers, surfactants, tracers, fluorescent agents, odorous agents and solubilizing agents.

5. An azeotropic composition comprising about 67 mol % of 2,3,3,3-tetrafluoropropene and about 33 mol % of 1,2-difluoroethylene, wherein the composition is azeotropic at a temperature of 39° C. and a pressure of 10 bar.

6. A heat transfer fluid comprising the azeotropic composition of claim 5 and at least one additive selected from the group consisting of lubricants, nanoparticles, stabilizers, surfactants, tracers, fluorescent agents, odorous agents and solubilizing agents.

7. An azeotropic composition comprising about 69 mol % of 2,3,3,3-tetrafluoropropene and about 31 mol % of 1,2-difluoroethylene, wherein the composition is azeotropic at a temperature of 56° C. and a pressure of 15 bar.

8. A heat transfer fluid comprising the azeotropic composition of claim 7 and at least one additive selected from the group consisting of lubricants, nanoparticles, stabilizers, surfactants, tracers, fluorescent agents, odorous agents and solubilizing agents.

\* \* \* \* \*